United States Patent
Tsuri et al.

[11] Patent Number: 6,057,017
[45] Date of Patent: May 2, 2000

[54] POLYOLEFIN-COATED STEEL PIPE HAVING HIGH RESISTANCE TO THERMAL OXIDATIVE DEGRADATION AND HIGH WEATHERABILITY AND A PROCESS FOR MANUFACTURING THE SAME

[75] Inventors: Shiro Tsuri; Kenji Takao; Kazuo Mochizuki, all of Chiba, Japan

[73] Assignee: Kawasaki Steel Corporation, Hyogo, Japan

[21] Appl. No.: 09/077,917

[22] PCT Filed: Oct. 27, 1997

[86] PCT No.: PCT/JP97/03895

§ 371 Date: Jun. 5, 1998

§ 102(e) Date: Jun. 5, 1998

[87] PCT Pub. No.: WO98/18619

PCT Pub. Date: May 7, 1998

[30] Foreign Application Priority Data

Oct. 28, 1996 [JP] Japan ..................... 8-284807

[51] Int. Cl.[7] .......................... C08K 5/34; C08K 5/3492; F16L 9/02; F16L 9/14
[52] U.S. Cl. ........................ 428/35.9; 428/414; 428/416
[58] Field of Search ................... 428/35.9, 414, 428/416

[56] References Cited

U.S. PATENT DOCUMENTS

| | | | |
|---|---|---|---|
| 4,606,953 | 8/1986 | Suzuki et al. | 428/36 |
| 4,863,982 | 9/1989 | Stegmann et al. | 524/101 |
| 4,994,508 | 2/1991 | Shiraki et al. | 524/14 |
| 5,132,344 | 7/1992 | Matteodo | 524/101 |

FOREIGN PATENT DOCUMENTS

| | | |
|---|---|---|
| 5-92514 | 4/1993 | Japan . |
| 8-25560 | 1/1996 | Japan . |
| 8-159368 | 6/1996 | Japan . |

*Primary Examiner*—Rena L. Dye
*Assistant Examiner*—Sandra M. Nolan
*Attorney, Agent, or Firm*—Oliff & Berridge, PLC

[57] ABSTRACT

In a polyolefin-coated steel pipe having an epoxy primer layer, a maleic anhydride-modified polyolefin layer and a polyolefin layer formed one upon another on the external surface of a steel pipe, the maleic anhydride-modified polyolefin layer contains at least three kinds of specific antioxidants, and the polyolefin layer contains those antioxidants, a specific light stabilizer and a specific inorganic pigment. A process for manufacturing it is also disclosed. The polyolefin-coated steel pipe has both a high level of resistance to deterioration by thermal oxidation and a high level of weatherability. Both of the maleic anhydride-modified polyolefin layer and the polyolefin layer are preferably of an ethylene-propylene block copolymer.

6 Claims, No Drawings

POLYOLEFIN-COATED STEEL PIPE HAVING HIGH RESISTANCE TO THERMAL OXIDATIVE DEGRADATION AND HIGH WEATHERABILITY AND A PROCESS FOR MANUFACTURING THE SAME

TECHNICAL FIELD

This invention relates to a polyolefin-coated steel pipe having high resistance to deterioration by oxidation under heat and high weatherability, and used in a pipeline, or as a pipe for piping.

BACKGROUND ART

It has recently become usual practice to heat a fluid in a pipeline and thereby lower its viscosity, or elevate its pressure in order to raise the efficiency of its transport. As a result, there has grown a demand for a coated steel pipe which can withstand use in an environment having an elevated temperature of, say, 100° C. and an elevated pressure.

A polyethylene-coated steel pipe which has hitherto been used in a pipeline for conveying petroleum, gas or water can only withstand use at a temperature not exceeding, say, 60° C., since polyethylene softens at a higher temperature. Even a pipe coated with high-density polyethylene can only withstand use at a temperature not exceeding, say, 70° C. or 80° C., and cannot withstand continued use at 100° C.

It is, therefore, necessary to explore a thermoplastic resin which can be used for coating a steel pipe to make it suitable for use at a temperature as high as, say, 100° C. Polypropylene is most preferable as the least expensive thermoplastic resin that can be used for making a coated pipe by using any apparatus existing for making a polyethylene-coated steel pipe. The problems as stated at (1) and (2) below, however, have to be overcome to enable the practical use of polypropylene for coating steel pipes:

(1) The prolonged exposure of polypropylene to a high temperature in the presence of oxygen causes its degradation by thermal oxidation resulting in a cracked layer of polypropylene having only a seriously low level of corrosion resistance; and (2) If polypropylene is left exposed to an outdoor environment for a long time, the ultraviolet radiation which the sunlight contains causes its degradation by photo-oxidation resulting in a cracked layer of polypropylene having only a seriously low level of corrosion resistance.

Japanese Patent Application Laid-Open No. Hei 8-25560 proposes a steel material coated with a polypropylene resin as a solution to the problems as stated. The proposed solution, however, relies upon the addition as a principal material of a phenolic antioxidant having an ester group, or cyclic amide in its molecule, and it has been found that the proposed material has a sharp lowering in its resistance to deterioration by thermal oxidation in a humid environment having a temperature of 80° C. or above, since the phenolic antioxidant is lost by hydrolysis in a humid atmosphere having a high temperature of 80° C. to 100° C.

Although a polypropylene-coated steel pipe, which is primarily intended for use under the ground, is not required to have a long period of weatherability lasting for as long as, say, 40 years, it is essentially required to have a short term of weatherability lasting for, say, five years, since it is likely to remain exposed to the light of the sun until the work of its installation is completed.

There is known a case in which a steel pipe coated with polyethylene containing about 2% by weight of carbon black has maintained weatherability for about 40 years. The addition of carbon black to polypropylene, however, brings about a serious lowering of its resistance to deterioration by thermal oxidation in a humid environment having a high temperature, whatever oxidation inhibitor may be added to it. Accordingly, there has been wanted a technique other than the addition of carbon black which is applicable to a polypropylene-coated steel pipe.

It is, therefore, an object of this invention to provide a polyolefin-coated steel pipe having both resistance to deterioration by thermal oxidation and weatherability, and also an effective process for manufacturing the same.

DISCLOSURE OF THE INVENTION

We, the inventors of this invention, have first tried to find out an adequate formulation of antioxidant and a light stabilizer which can be added to polypropylene without affecting its heat resistance, and as a result of our continued research efforts, we have completed this invention by finding that it is possible to obtain a polyolefin-coated steel pipe having both high resistance to deterioration by thermal oxidation and high weatherability if a combination of a specific antioxidant, a specific light stabilizer and a specific inorganic pigment is added to a resin layer on the pipe.

According to this invention, there is, thus, provided a polyolefin-coated steel pipe comprising a steel pipe having a external surface coated with an epoxy primer layer, a maleic anhydride-modified polyolefin layer and a polyolefin layer lying one upon another, and having high levels of resistance to deterioration by thermal oxidation and weatherability, wherein the maleic anhydride-modified polyolefin layer contains compounds (A) to (C) as its essential components, and the polyolefin layer contains compounds (A) to (E) as its essential components:

(A): 1,3,5-trimethyl-2,4,6-tris(3,5-di-tert-butyl-4-hydroxybenzyl)benzene;

(B): at least one compound selected from among tetrakis{[3-(3,5-di-tert-butyl-4-hydroxyphenyl)-propionyloxy]methyl}methane, 1,3,5-tris(4-tert-butyl-3-hydroxy-2,6-dimethylbenzyl)-isocyanuric acid and 3,9-bis{2-[3-(3-tert-butyl-4-hydroxy-5-methylphenyl)propionyloxy]-1,1-dimethylethyl}-2,4,8,10-tetraoxaspiro[5,5]undecane;

(C): pentaerythritol tetrakis(3-laurylthiopropionate);

(D): at least one compound selected from among 2,4-di-tert-butylphenyl 3',5'-di-tert-butyl-4'-hydroxybenzoate, 4-tert-octylphenyl salicylate, 2-(2'-hydroxy-5'-methylphenyl)-benzotriazole, 2-(3',5'-di-tert-butyl-2'-hydroxyphenyl)-benzotriazole, 2-(3'-tert-butyl-2'-hydroxy-5'-methylphenyl)-5-chlorobenzotriazole and 2-(3',5'-di-tert-butyl-2'-hydroxyphenyl)-5-chlorobenzotriazole; and (E): rutile type titanium dioxide.

An ethylene-propylene block copolymer is preferably used as the backbone polymer forming each of the maleic anhydride-modified polyolefin layer and the polyolefin layer on the polyolefin-coated steel pipe.

In any polyolefin-coated steel pipe as defined above, it is preferable that the essential components (A) to (C) occupy a total of 0.1 to 3.0% by weight of the total amount of the maleic anhydride-modified polyolefin layer and the polyolefin layer, that the essential component (D) occupy 0.05 to 2.0% by weight of the polyolefin layer, and that the essential component (E) occupy 0.1 to 2.0% by weight of the polyolefin layer.

According to this invention, there is also provided a process for manufacturing a polyolefin-coated steel pipe having high levels of resistance to deterioration by thermal oxidation and weatherability which comprises forming an epoxy primer layer, a maleic anhydride-modified polyolefin layer and a polyolefin layer one upon another on the external surface of a steel pipe, wherein the maleic anhydride-modified polyolefin layer is formed from a material prepared by mixing compounds (A) to (C) as its essential components in a Henschel mixer, and the polyolefin layer is formed from a material prepared by mixing compounds (A) to (D) as its essential components in a Henschel mixer and admixing compound (E) as another essential component thereof:

(A): 1,3,5-trimethyl-2,4,6-tris(3,5-di-tert-butyl-4-hydroxybenzyl)benzene;
(B): at least one compound selected from among tetrakis{[3-(3,5-di-tert-butyl-4-hydroxyphenyl)-propionyloxy]methyl}methane, 1,3,5-tris(4-tert-butyl-3-hydroxy-2,6-dimethylbenzyl)-isocyanuric acid and 3,9-bis{2-[3-(3-tert-butyl-4-hydroxy-5-methylphenyl)propionyloxy]-1,1-dimethylethyl}-2,4,8,10-tetraoxaspiro[5,5]undecane;
(C): pentaerythritol tetrakis(3-laurylthiopropionate);
(D): at least one compound selected from among 2,4-di-tert-butylphenyl 3',5'-di-tert-butyl-4'-hydroxybenzoate, 4-tert-octylphenyl salicylate, 2-(2'-hydroxy-5'-methylphenyl)-benzotriazole, 2-(3',5'-di-tert-butyl-2'-hydroxyphenyl)-benzotriazole, 2-(3'-tert-butyl-2'-hydroxy-5'-methylphenyl)-5-chlorobenzotriazole and 2-(3',5'-di-tert-butyl-2'-hydroxyphenyl)-5-chlorobenzotriazole; and
(E): rutile type titanium dioxide.

In the process for manufacturing a polyolefin-coated steel pipe as defined above, an ethylene-propylene block copolymer is preferably used as the backbone polymer forming each of the maleic anhydride-modified polyolefin layer and the polyolefin layer on the steel pipe.

In any process for manufacturing a polyolefin-coated steel pipe as defined above, it is preferable that the essential components (A) to (C) be so employed as to occupy a total of 0.1 to 3.0% by weight of the total amount of the maleic anhydride-modified polyolefin layer and the polyolefin layer, that the essential component (D) be so employed as to occupy 0.05 to 2.0% by weight of the polyolefin layer, and that the essential component (E) be so employed as to occupy 0.1 to 2.0% by weight of the polyolefin layer.

BEST MODE OF CARRYING OUT THE INVENTION

The invention will now be described in detail.

The polyolefin-coated steel pipe according to this invention comprises an epoxy primer layer, a maleic anhydride-modified polyolefin layer and a polyolefin layer formed one upon another on the external surface of a steel pipe.

The peripheral surface of a steel pipe usually means its outer external surface, but does not preclude its internal surface. It is important that the external surface of the steel pipe to which the epoxy primer layer is bonded be kept clean to ensure an improved adhesive strength therebetween. More specifically, it is preferable to remove any oxide layer, oil, etc. from the surface of the steel pipe and finish its surface so that it may have a ten-point average roughness (sometimes referred to as Rz) of, say, 40 to 100 microns. Although means to be used for removing an oxide layer, oil, etc. is not particularly limited, it is beneficial to employ, for example, steel blasting, or steel grit blasting.

The epoxy primer layer formed on the peripheral surface of the steel pipe is of a two- or one-pack epoxy primer, and preferably has a thickness of, say, 10 to 100 microns if the surface roughness of the steel pipe is taken into account.

A phosphoric or chromic acid type rust-preventive pigment may be added as an inorganic pigment to the epoxy primer on the polyolefin-coated steel pipe of this invention for restraining the cathodic delamination of the coating layer resulting from cathodic protection and for improving the adhesion durability of the coating layer which is affected by water permeating through it. The rust-preventive pigment is preferably added in the amount of 5 to 40% by weight relative to the epoxy resin employed as the main component of the primer. A chromate treatment may be applied onto the surface of the steel pipe prior to the application of the primer for achieving improved levels of adhesive durability and corrosion resistance.

According to this invention, the maleic anhydride-modified polyolefin layer is, then, formed on the epoxy primer layer, and the polyolefin layer is further formed thereon.

It is preferable for the maleic anhydride-modified polyolefin layer to have a thickness of 100 to 500 microns, and for the polyolefin layer to have a thickness of 1 to 4 mm. If the maleic anhydride-modified polyolefin layer has a thickness of less than 100 microns, it has a seriously low adhesive strength, and if it exceeds 500 microns, no economically compensating result can be expected. If the polyolefin layer has a thickness of less than 1 mm, it has a seriously low corrosion resistance, and if it exceeds 4 mm, no economically compensating result can be expected in corrosion resistance.

The maleic anhydride-modified polyolefin layer is preferably of a maleic anhydride-modified product of an ethylene-propylene block copolymer having a high resistance to embrittlement at a low temperature and a high modulus of elasticity at a high temperature. The polyolefin layer is also preferably of an ethylene-propylene block copolymer.

While the polyolefin resins are generally crystalline polymers, polypropylene has a higher degree of crystallinity than that of polyethylene, and therefore, an embrittle temperature in the vicinity of 0° C. which is higher than that of polyethylene. Pipes for a pipeline are mainly used outdoors, and are likely to be exposed to an ambient temperature of as low as −20° C. when they are installed in a cold place. A polypropylene-coated steel pipe is sometimes difficult to employ in such an environment, since even a small impact is likely to cause the polypropylene layer on the pipe to crack.

It is effective to introduce polyethylene chains in place of a part of polypropylene chains in order to improve the resistance of polypropylene to embrittlement at a low temperature. The polypropylene in which polyethylene has been introduced can be roughly classified by structural features into random and block copolymers. The former, or random copolymer has a by far lower melting point than that of polypropylene, softens at a high temperature, and has a seriously low degree of indentation hardness at 120° C. The latter, or block copolymer has a melting point not substantially lower than that of polypropylene, but a greatly lower embrittle temperature.

According to this invention, therefore, it is preferable to use an ethylene-propylene block copolymer, since it is satisfactory in both of resistance to embrittlement at a low temperature and indentation hardness at 120° C.

The maleic anhydride-modified polyolefin layer further contains (A) to (C) as antioxidants, and the polyolefin layer further contains (A) to (E) as antioxidants, a light stabilizer and an inorganic pigment. No light stabilizer, or pigment need be added to the maleic anhydride-modified polyolefin layer, since it is covered with the polyolefin layer.

(A): 1,3,5-trimethyl-2,4,6-tris(3,5-di-tert-butyl-4-hydroxybenzyl)benzene;

(B): at least one selected from among tetrakis{[3-(3,5-di-tert-butyl-4-hydroxyphenyl)-propionyloxy]methyl}methane, 1,3,5-tris(4-tert-butyl-3-hydroxy-2,6-dimethylbenzyl)-isocyanuric acid and 3,9-bis{2-[3-(3-tert-butyl-4-hydroxy-5-methylphenyl)propionyloxy]-1,1-dimethylethyl}-2,4,8,10-tetraoxaspiro[5,5]undecane;

(C): pentaerythritol tetrakis(3-laurylthiopropionate);

(D): at least one selected from among 2,4-di-tert-butylphenyl 3',5'-di-tert-butyl-4'-hydroxybenzoate, 4-tert-octylphenyl salicylate, 2-(2'-hydroxy-5'-methylphenyl)-benzotriazole, 2-(3',5'-di-tert-butyl-2'-hydroxyphenyl)-benzotriazole, 2-(3'-tert-butyl-2'-hydroxy-5'-methylphenyl)-5-chlorobenzotriazole and 2-(3',5'-di-tert-butyl-2-hydroxyphenyl)-5-chlorobenzotriazole; and (E): rutile type titanium dioxide.

While the polyolefin-coated steel pipe is required to resist deterioration by thermal oxidation as stated above, it is likely, as it is laid under the ground, that the antioxidant may be lost as a result of hydrolysis by water in the earth. We have, therefore, decided to use an antioxidant having also a high degree of extraction resistance.

As a result, we have found that (A) 1,3,5-trimethyl-2,4,6-tris(3,5-di-tert-butyl-4-hydroxybenzyl)benzene as listed above, having a high molecular weight and not having any easily hydrolyzable ester group in its molecule, has also a high degree of extraction resistance, and remains as an antioxidant, and can effectively realize an improved resistance to deterioration by thermal oxidation. The compound (A) is commercially available in the tradename of IRGANOX 1330 (product of Ciba-Geigy).

In order to achieve an improved resistance to deterioration by thermal oxidation in a hot and dry environment having a higher oxygen concentration than in a humid environment, it is preferable to use a phenolic antioxidant having a high melting point and a particularly good resistance to deterioration by thermal oxidation, or more specifically, to use (B) at least one compound selected from among tetrakis{[3-(3,5-di-tert-butyl-4-hydroxyphenyl)-propionyloxy]methyl}methane, 1,3,5-tris(4-tert-butyl-3-hydroxy-2,6-dimethylbenzyl)-isocyanuric acid and 3,9-bis{2-[3-(3-tert-butyl-4-hydroxy-5-methylphenyl)-propionyloxy]-1,1-dimethylethyl}-2,4,8,10-tetraoxaspiro-[5,5]undecane. As these compounds (B), it is possible to use, for example, products which are commercially available in the tradenames of Sumilizer BP-101 (product of Sumitomo Chemical Co.), Cyanox 1790 (product of ACC) and Sumilizer GA-80 (product of Sumitomo Chemical Co.), respectively.

We have also succeeded in imparting a drastically improved resistance to deterioration by thermal oxidation to a polypropylene resin by using, with a phenolic antioxidant, (C) pentaerythritol tetrakis(3-laurylthio-propionate) as a thioether type antioxidant known by the synergistic effect which it produces when used with a phenolic antioxidant. The compound (C) is commercially available in the tradename of, for example, Sumilizer TP-D (product of Sumitomo Chemical Co.).

We have noticed that if a polypropylene resin is exposed to a hot and humid environment, its resistance to deterioration by thermal oxidation is greatly lowered due to the absence of any synergistic effect of a phenolic and a thioether type antioxidant, since one or both of them are dissolved away. We have, therefore, selected 1,3,5-trimethyl-2,4,6-tris(3,5-di-tert-butyl-4-hydroxybenzyl)-benzene not having any ester group in its molecule as one of the phenolic antioxodants, and succeeded in restraining the hydrolysis and dissolution of the antioxidant.

Although the proportions of the antioxidants (A) to (C) are not particularly limited, they are preferably employed in a total amount of 0.1 to 3.0% by weight relative to the total amount of the maleic anhydride-modified polyolefin layer and the polyolefin layer. If the total amount of the antioxidants is less than 0.1% by weight, it is difficult for them to impart a high level of resistance to deterioration by thermal oxidation. If it exceeds 3.0% by weight, the antioxidants bleed out on the surface of polypropylene and impair its appearance.

Referring now to the light stabilizer (D), it is important not only that it give the polyolefin layer a high degree of weatherability, but also that its addition not impair the resistance of the layer to deterioration by thermal oxidation, and it is, therefore, beneficial to select at least one light stabilizer from among a benzoate or salicylate not opposing the action of a sulfur-based oxidation inhibitor, i.e. 2,4-di-tert-butylphenyl 3',5'-di-tert-butyl-4'-hydroxybenzoate or 4-tert-octylphenyl salicylate of group (D) as listed before, or benzotriazoles, i.e. 2-(2'-hydroxy-5'-methylphenyl)-benzotriazole, 2-(3',5'-di-tert-butyl-2'-hydroxyphenyl)-benzotriazole, 2-(3'-tert-butyl-2'-hydroxy-5'-methylphenyl)-5-chlorobenzotriazole and 2-(3',5'-di-tert-butyl-2'-hydroxyphenyl)-5-chlorobenzo-triazole of group (D). The above compounds (D) are commercially available in the tradenames of, for example, Sumisorb 400 (product of Sumitomo Chemical Co.), Inhibitor OPS (product of Eastmann), Sumisorb 200 (product of Sumitomo Chemical Co.), Sumisorb 320 (product of Sumitomo Chemical Co.), Sumisorb 300 (product of Sumitomo Chemical Co.) and TINUVIN 327 (product of Ciba-Geigy), respectively.

The amount of the benzoate, salicylate or benzotriazole added as the light stabilizer is not particularly limited, but is preferably from 0.05 to 2.0% by weight relative to polypropylene. If its amount is less than 0.05% by weight, it is effective only to a low degree, and if it exceeds 2.0% by weight, no better effect can be expected, but a higher cost is incurred.

As every thioether type antioxidant has an ester group in its molecule, pentaerythritol tetrakis(3-laurylthiopropionate) (C) is used, as it has a higher molecular weight than any other compound. It is important to mix pentaerythritol tetrakis(3-laurylthiopropionate) uniformly in the polyolefin resin so that its dissolution may be prevented, and it is, therefore, beneficial to knead them by using a Henschel mixer. The light stabilizer has also to be mixed uniformly in the polyolefin resin.

The kneading by a Henschel mixer makes it possible to disperse the antioxidants and light stabilizer uniformly in the polyolefin and modified polyolefin and thereby obtain good resistance to deterioration by thermal oxidation, since there is not formed any portion of high concentration from which extraction occurs in an accelerated way, or any portion of low concentration from which deterioration by thermal oxidation extends.

When the manufacturing process is actually carried out, it is efficient to prepare a master batch of a polyolefin and an inorganic pigment having a high concentration beforehand, while mixing the thioether type antioxidant and the light stabilizer in the polyolefin resin by a Henschel mixer, and melt and mix it with the polyolefin resin containing the dispersed oxidation inhibitor and light stabilizer at a stage immediately prior to the application of the mixture to a pipe. A Henschel mixer can, of course, be used for mixing the inorganic pigment with the polyolefin, too.

Referring finally to the inorganic pigment (E), it is important, like the light stabilizer, not only that it give the polyolefin layer a high degree of weatherability, but also that its addition not impair the resistance of the layer to deterioration by thermal oxidation, and we have adopted rutile type titanium dioxide. The amount of titanium dioxide to be employed is preferably from about 0.1 to about 2.0% by weight. If its amount is less than 0.1% by weight, it has only a little effect in cutting off ultraviolet radiation from the light of the sun, and if it exceeds 2.0% by weight, it brings about a reduction in the impact resistance of the polyolefin. Incidentally, it is all right to use titanium dioxide which has been given the surface treatment employed for lowering its activity.

Prior to the formation of the epoxy primer layer on the external surface of the steel pipe, the steel pipe is given a surface finish to a roughness, Rz, of, say, 40 to 100 microns by, for example, steel blasting, or steel grit treatment, whereafter the epoxy primer layer, maleic anhydride-modified polyolefin layer, and polyolefin layer are formed one upon another.

The epoxy primer layer may be formed by die coating the steel pipe surface with a resin solution consisting of a mixture of an epoxy resin as its principal material, a curing agent, a catalyst, etc., and baking it at 100° C. to 200° C. for curing it to form a layer having a thickness of 10 to 100 microns.

Then, the maleic anhydride-modified polyolefin layer and the polyolefin layer are each formed by preparing an appropriate mixture of antioxidants, light stabilizer and inorganic pigment, as the case may be, in an appropriate way, melting it in a nitrogen atmosphere, coating the steel pipe surface with the molten mixture through a circular, or T die, and cooling it with water. It is preferable that the modified polyolefin layer have a thickness of 100 to 500 microns, while the polyolefin layer has a thickness of 1 to 4 mm.

EXAMPLES

The invention will now be described more specifically based on examples embodying it.

Sheets of ethylene-propylene block copolymers having a thickness of 2 mm were formed by mixing specific amounts of various antioxidants and light stabilizers as shown in Table 1 with pellets of ethylene-propylene block copolymers in a Henschel mixer, and after at least one minute of its dispersing operation, melting the mixtures by heating to or above 230° C. in a nitrogen gas atmosphere, and kneading the molten mixtures thoroughly with master batches of an inorganic pigment and ethylene-propylene block copolymers which had been prepared beforehand.

The sheets of ethylene-propylene block copolymers as obtained were examined for their resistance to deterioration by thermal oxidation, and weatherability.

Their resistance to deterioration by thermal oxidation was determined by stamping a JIS 2 type 1/2 testpiece from each copolymer sheet, exposing it to the temperatures of 140° C., 150° C. and 160° C. in a Geer oven and also in an autoclave, conducting its tensile test (at a stress rate of 20 mm/min. by a device having a chuck distance of 40 mm), and finding the time after which the heated copolymer had its elongation at break (or its initial elongation at break of about 400%) lowered to 50%, and which was defined as its life of resistance to deterioration by thermal oxidation at each temperature tested. The life of the testpiece as expected in its resistance to deterioration by thermal oxidation at 100° C. was estimated by extrapolation from a diagram showing the correlation between the test temperatures of 140° C., 150° C. and 160° C. and its life as determined at those temperatures.

The autoclave was filled with pure water, and its water was changed every week. Accordingly, the results of the tests conducted by using the Geer oven represent the life of such resistance of each testpiece in a dry environment, while the results obtained by using the autoclave indicate its life in a humid environment. The same methods were employed for testing the life of resistance of each sheet of the maleic anhydride-modified ethylene-propylene block copolymer to deterioration by thermal oxidation.

A carbon arc sunshine weatherometer was employed for conducting weatherability evaluation by using a black panel temperature of 63° C., a humidity of 50% and a pure water spray time of 12 minutes (a processing time of 120 minutes), and the actual weatherability of each testpiece of the ethylene-propylene block copolymer was inferred from the time of exposure after which the copolymer had its elongation at break lowered to 50%. The weatherability evaluation was limited to the ethylene-propylene block copolymer forming the outermost layer which would be exposed directly to sunlight in an actual environment of use.

The results of the evaluation as to resistance to deterioration by thermal oxidation and weatherability are shown in Tables 1 and 2. The ethylene-propylene block copolymer-coated steel pipe of the type under description has a period of at least 20 years as the target value of its resistance to deterioration by thermal oxidation in both a dry and a humid environment, and a period of at least 6,000 hours as the target value of its weatherability.

It is obvious from Table 1 that the target values as stated above can be attained if the components (A) to (E) are employed in accordance with this invention. On the other hand, it was impossible to obtain satisfactory results in resistance to deterioration by thermal oxidation, or weatherability, or both from Comparative Examples 1 to 10 and 19 to 21 lacking one or more of the five kinds of additives as described above, and from Comparative Examples 11 to 18 employing an antioxidant, light stabilizer, or inorganic pigment other than those five kinds of additives, as is obvious from Table 2.

The following are the additives shown as A to I in Tables 1 and 2:

A: 1,3,5-trimethyl-2,4,6-tris(3,5-di-tert-butyl-4-hydroxybenzyl)benzene;
B-1: tetrakis{[3-(3,5-di-tert-butyl-4-hydroxyphenyl)-propionyloxy]methyl}methane;
B-2: 1,3,5-tris(4-tert-butyl-3-hydroxy-2,6-dimethylbenzyl)-isocyanuric acid;
B-3: 3,9-bis{2-[3-(3-tert-butyl-4-hydroxy-5-methylphenyl) propionyloxy]-1,1-dimethylethyl}-2,4,8,10-tetraoxaspiro [5,5]undecane;
C: pentaerythritol tetrakis(3-laurylthiopropionate);
D-1: 2,4-di-tert-butylphenyl 3',5'-di-tert-butyl-4'-hydroxybenzoate;
D-2: 4-tert-octylphenyl salicylate;
D-3: 2-(2'-hydroxy-5'-methylphenyl)-benzotriazole;
D-4: 2-(3',5'-di-tert-butyl-2'-hydroxyphenyl)-benzotriazole;
D-5: 2-(3'-tert-butyl-2'-hydroxy-5'-methylphenyl)-5-chlorobenzotriazole;
D-6: 2-(3',5'-di-tert-butyl-2'-hydroxyphenyl)-5-chlorobenzotriazole;
E: rutile type titanium dioxide
F: N,N'-bis-(3-(3',5')-di-tert-4-hydroxyphenyl)-propionylhexamethylenediamine.
G: distearyl-3-3'-thiodipropionate;
H: N,N'-bis-(3-aminopropyl)ethylenediamine 2,4 -bis(N-butyl-N-(1,2,2,6,6-pentamethyl-4-piperidyl)amino)-6-chloro-1,3,5-triazine condensate; and
I: carbon black.

TABLE 1

| Ex. | Resin | A | B-1 | B-2 | B-3 | C | D-1 | D-2 | D-3 | D-4 | D-5 | D-6 | E | F | G | H | I | Life of heat resistance at 100° C. (years) Dry environment | Life of heat resistance at 100° C. (years) Humid environment | Weatherability (hr) |
|---|---|---|---|---|---|---|---|---|---|---|---|---|---|---|---|---|---|---|---|---|
| 1 | α | 0.10 | 0.10 | | | 0.20 | 0.2 | | | | | | 1 | | | | | 25 | 25 | 6500 |
| 2 | α | 0.10 | | 0.1 | | 0.20 | | 0.2 | | | | | 1 | | | | | 25 | 25 | 6500 |
| 3 | α | 0.10 | | | 0.1 | 0.20 | 0.2 | | | | | | 1 | | | | | 25 | 25 | 6500 |
| 4 | α | 0.10 | 0.10 | | | 0.20 | | | 0.2 | | | | 1 | | | | | 25 | 25 | 6500 |
| 5 | α | 0.10 | | 0.1 | | 0.20 | | | | 0.2 | | | 1 | | | | | 25 | 25 | 6500 |
| 6 | α | 0.10 | | | 0.1 | 0.20 | | | | | 0.2 | | 1 | | | | | 25 | 25 | 6500 |
| 7 | α | 0.10 | 0.10 | | | 0.20 | | | | | | 0.2 | 1 | | | | | 25 | 25 | 6500 |
| 8 | β | 0.10 | 0.10 | | | 0.20 | | | | | | | | | | | | 25 | 25 | |
| 9 | β | 0.10 | | 0.1 | | 0.20 | | | | | | | | | | | | 25 | 25 | |
| 10 | β | 0.10 | | | 0.1 | 0.20 | | | | | | | | | | | | 25 | 25 | |

α: Ethylene-propylene block copolymer
β: Maleic anhydride-modified ethylene-propylene block copolymer
Ex.: Example of the invention

TABLE 2

| Comp. Ex. | Resin | A | B-1 | B-2 | B-3 | C | D-1 | D-2 | D-3 | D-4 | D-5 | D-6 | E | F | G | H | I | Life of heat resistance at 100° C. (years) Dry environment | Life of heat resistance at 100° C. (years) Humid environment | Weatherability (hr) |
|---|---|---|---|---|---|---|---|---|---|---|---|---|---|---|---|---|---|---|---|---|
| 1 | α | | 0.10 | | | 0.20 | 0.2 | | | | | | 1 | | | | | 20 | 15 | 6500 |
| 2 | α | 0.10 | | | | 0.20 | 0.2 | | | | | | 1 | | | | | 15 | 10 | 6500 |
| 3 | α | 0.10 | 0.10 | | | | 0.2 | | | | | | 1 | | | | | 10 | 10 | 6500 |
| 4 | α | 0.10 | 0.10 | | | 0.20 | | | | | | | 1 | | | | | 25 | 25 | 3000 |
| 5 | α | 0.10 | 0.10 | | | 0.20 | 0.2 | | | | | | 1 | | | | | 25 | 25 | 3000 |
| 6 | α | | 0.10 | | | 0.20 | | | 0.2 | | | | 1 | | | | | 20 | 15 | 6500 |
| 7 | α | 0.10 | | | | 0.20 | | | 0.2 | | | | 1 | | | | | 15 | 10 | 6500 |
| 8 | α | 0.10 | 0.10 | | | | | | 0.2 | | | | 1 | | | | | 10 | 10 | 6500 |
| 9 | α | 0.10 | 0.10 | | | 0.20 | | | | | | | 1 | | | | | 25 | 25 | 3000 |
| 10 | α | 0.10 | 0.10 | | | 0.20 | | | 0.2 | | | | 1 | | | | | 25 | 25 | 3000 |
| 11 | α | 0.10 | | | | 0.20 | 0.2 | | | | | | 1 | 0.1 | | | | 15 | 15 | 6500 |
| 12 | α | 0.10 | 0.10 | | | 0.20 | | | | | | | 1 | | | 0.2 | | 20 | 10 | 6000 |
| 13 | α | 0.10 | 0.10 | | | | 0.2 | | | | | | 1 | | 0.15 | | | 15 | 10 | 2500 |
| 14 | α | 0.10 | 0.10 | | | 0.20 | 0.2 | | | | | | 1 | | | | 1 | 20 | 10 | 5000 |
| 15 | α | 0.10 | | | | 0.20 | | | 0.2 | | | | 1 | 0.1 | | | | 15 | 15 | 6500 |
| 16 | α | 0.10 | 0.10 | | | 0.20 | | | | | | | 1 | | | 0.2 | | 25 | 25 | 4000 |
| 17 | α | 0.10 | 0.10 | | | | | | 0.2 | | | | 1 | | 0.15 | | | 15 | 10 | 2500 |
| 18 | α | 0.10 | 0.10 | | | 0.20 | | | 0.2 | | | | 1 | | | | 1 | 20 | 10 | 5000 |
| 19 | α | | 0.10 | | | 0.20 | | | | | | | | | | | | 25 | 10 | 30 |
| 20 | β | | 0.10 | | | 0.20 | | | | | | | | | | | | 15 | 15 | |
| 21 | β | 0.10 | | | | 0.20 | | | | | | | | | | | | 10 | 10 | |
| 22 | β | 0.10 | 0.10 | | | | | | | | | | | | | | | 10 | 10 | |

α and β are as explained in Table 1; Comp. Ex.: Comparative Example

INDUSTRIAL UTILITY

According to this invention, it is possible to obtain a polyolefin-coated steel pipe having particularly high levels of resistance to deterioration by thermal oxidation and weatherability. Therefore, it can be used in a pipeline for a fluid to be conveyed under heat and pressure, or as a steel pipe for piping to maintain a high efficiency in conveying the fluid.

What is claimed is:

1. A polyolefin-coated steel pipe comprising a steel pipe having an external surface coated with an epoxy primer layer, a maleic anhydride-modified polyolefin layer and a polyolefin layer lying one upon another in that order, wherein the maleic anhydride-modified polyolefin layer contains compounds A to C, and the polyolefin layer contains compounds A to E:

A: 1,3,5-trimethyl-2,4,6-tris(3,5-di-tert-butyl-4-hydroxybenzyl)benzene;

B: at least one compound selected from the group consisting of tetrakis{[3-(3,5-di-tert-butyl-4-hydroxyphenyl)-propionyloxy]methyl}methane, 1,3,5-tris(4-tert-butyl-3-hydroxy-2,6-dimethylbenzyl)-isocyanuric acid, and 3,9-bis{2-[3-(3-tert-butyl-4-hydroxy-5-methylphenyl) propionyloxy]-1,1-dimethylethyl}-2,4,8,10-tetraoxaspiro [5,5]undecane;

C: pentaerythritol tetrakis(3-laurylthiopropionate);

D: at least one selected from the group consisting of 2,4-di-tert-butylphenyl 3',5'-di-tert-butyl-4'-hydroxybenzoate, 4-tert-octylphenyl salicylate, 2-(2'-hydroxy-5'-methylphenyl)-benzotriazole, 2-(3-,5'-di-tert-butyl-2'-hydroxyphenyl)-benzotriazole, 2-(3'-tert-butyl-2'-hydroxy-5'-methylphenyl)-5-chlorobenzo triazole and 2-(3',5'-di-tert-butyl-2'-hydroxyphenyl)-5-chlorobenzotriazole; and E: rutile type titanium dioxide.

2. A polyolefin-coated steel pipe as set forth in claim 1, wherein the backbone polymer forming each of said maleic anhydride-modified polyolefin layer and said polyolefin layer is an ethylene-propylene block copolymer.

3. A polyolefin-coated steel pipe as set forth in claim 1, wherein said essential components A to C occupy a total of 0.1 to 3.0% by weight of the total amount of said maleic anhydride-modified polyolefin layer and said polyolefin layer, said essential component D occupies 0.05 to 2.0% by weight of said polyolefin layer, and said essential component E occupies 0.1 to 2.0% by weight of said polyolefin layer.

4. A process for manufacturing a polyolefin-coated steel pipe which comprises forming an epoxy primer layer, a maleic anhydride-modified polyolefin layer and a polyolefin layer one upon another in that order on the external surface of a steel pipe, wherein the maleic anhydride-modified polyolefin layer is formed from a material prepared by mixing compounds A to C in a mixer, and the polyolefin layer is formed from a material prepared by mixing compounds A to D in a mixer and admixing compound E:

A: 1,3,5-trimethyl-2,4,6-tris(3,5-di-tert-butyl-4-hydroxybenzyl)benzene;

B: at least one compound selected from the group consisting of tetrakis{[3-(3,5-di-tert-butyl-4-hydroxyphenyl)-propionyloxy]methyl}methane, 1,3,5-tris(4-tert-butyl-3-hydroxy-2,6-dimethylbenzyl)-isocyanuric acid, and 3,9-bis{2-[3-(3-tert-butyl-4-hydroxy-5-methylphenyl) propionyloxy]-1,1-dimethylethyl}-2,4,6,8,10-tetraoxaspiro[5,5]undecane;

C: pentaerythritol tetrakis(3-laurylthiopropionate);

D: at least one compound selected from the group consisting of 2,4-di-tert-butylphenyl 3',5'-di-tert-butyl-4'-hydroxybenzoate, 4-tert-octylphenyl salicylate, 2-(2'-hydroxy-5'-methylphenyl)-benzotriazole, 2-(3',5'-di-tert-butyl-2'-hydroxyphenyl)-benzotriazole, 2-(3'-tert-butyl-2'-hydroxy-5'-methylphenyl)-5-chlorobenzo triazole and 2-(3',5'-di-tert-butyl-2'-hydroxyphenyl)-5-chlorobenzotriazole; and E: rutile type titanium dioxide.

5. A process for manufacturing a polyolefin-coated steel pipe as set forth in claim 4, wherein an ethylene-propylene block copolymer is used as the backbone polymer forming each of said maleic anhydride-modified polyolefin layer and said polyolefin layer.

6. A process for manufacturing a polyolefin-coated steel pipe as set forth in claim 4, wherein said essential components A to C are so employed as to occupy a total of 0.1 to 3.0% by weight of the total amount of said maleic anhydride-modified polyolefin layer and said polyolefin layer, said essential component D is so employed as to occupy 0.05 to 2.0% by weight of said polyolefin layer, and said essential component E is so employed as to occupy 0.1 to 2.0% by weight of said polyolefin layer.

\* \* \* \* \*